May 27, 1930.  L. T. FREDERICK  1,760,234
MEANS FOR AND METHOD OF MOLDING MATERIALS
Filed March 7, 1928   5 Sheets-Sheet 1

INVENTOR:
LOUIS T. FREDERICK
BY Cheever & Cox
Attys

May 27, 1930.  L. T. FREDERICK  1,760,234
MEANS FOR AND METHOD OF MOLDING MATERIALS
Filed March 7, 1928    5 Sheets-Sheet 3

INVENTOR:
LOUIS T. FREDERICK
BY Cheever & Cox
ATTY.S

Patented May 27, 1930

1,760,234

UNITED STATES PATENT OFFICE

LOUIS T. FREDERICK, OF VALPARAISO, INDIANA, ASSIGNOR TO CHICAGO MICA COMPANY, OF VALPARAISO, INDIANA, A CORPORATION OF INDIANA

MEANS FOR AND METHOD OF MOLDING MATERIALS

Application filed March 7, 1928. Serial No. 259,757.

My invention relates in general to a novel method and apparatus for feeding thermoplastic or heat curing moldable material, more particularly of the type known as phenolic condensation products of which bakelite is a form, to a closing mold, and has more particular reference to a novel arrangement for delivering such moldable material between the cooperating dies of a closing mold. More specifically, the apparatus of my invention is adapted to feed blocks of uncured moldable material at a uniform rate through a curing oven to the heated forming dies of the mold which are adapted to cooperate on either side of the conveyor to press the block to a desired form, and to finally cure the material.

The process heretofore employed in making pressed products of this general nature, has been a discontinuous process in which the material has been precured separately and then positioned in heated molds for a considerable period to allow the material to be pressed to the desired form and completely cured. Such a process has several disadvantages. The preliminary curing process must of necessity be slow and moldable materials having a quick curing characteristic can not be used for the reason that they will become over-cured and hence useless if not fed into the die at the exact instant when sufficiently cured for feeding to the die. This disadvantage has resulted in the provision of multiple die molds by the use of which the production of molded articles may be increased to offset the disadvantages of the slowness of the process. Materials having slow curing characteristics need to remain in the mold for a considerable period during the actual molding process which is not the case where quick curing materials are used. A number of skilled assistants are also necessary in preparing the material for the molding operation.

Materials having quick curing characteristics, that is to say, materials which may be cured in a few seconds, as distinguished from materials which are cured for several hours, are well known in the art and it is an important object of my present invention to provide a device for feeding quick curing materials to a closing mold to the end that the time of the curing process and the time necessary to mold the cured material may be decreased by performing the processes in a continuous manner.

Another important object of my present invention is to provide for feeding moldable materials at a uniform rate through a curing oven to a closing mold, the parts being so arranged that the mold receives properly cured moldable material as rapidly as is compatible with its successful operation and the moldable material remains in the curing oven during a period sufficient to properly cure the material.

Another object of my invention is to provide a machine whereby moldable material may be fed at a uniform rate to a closing mold without necessitating the employment of skilled operators to cure the material and to position it in the closing mold.

Another object of my invention is to reduce the time and labor heretofore considered necessary in forming molded objects, to reduce the cost of the curing and molding operations, to increase the production rate of the molded objects and to improve the quality of articles made from moldable materials.

Another object of my invention is to provide a conveyor adapted to receive and carry moldable material to a closing mold and to support the moldable material in position to be formed by the operation of the closing mold, the conveyor forming an integral portion of the mold during the molding operation.

Another object of my invention is to provide means for depositing moldable material at intervals in the conveyor.

Still another object of my invention is to provide a means for assembling in a conveyor a block of moldable material and an insert to form a blank from which a composite device may be molded.

Numerous other objects and advantages of the invention will be apparent as it is better understood from the following description which taken in connection with the accompanying drawings discloses a preferred embodiment of the invention.

Referring to the drawings.

To illustrate my invention I have shown on the drawings a closing mold and associated apparatus for feeding heat curable moldable material to the mold at a definite rate of speed through a curing zone in which the material may be pre-cured to a desired degree, the material being formed to a desired shape and finally cured in the mold. The closing mold comprises a main frame 11 in which a die operating shaft or ram 13, is mounted for vertically reciprocal movement. This shaft carries at its lower end a plurality of movable dies 15 recessed as at 16 to receive and mold a block of suitable material adapted to cooperate with lower stationary dies 17, mounted in the frame 11, to form a closing mold. The dies may be heated by any convenient method which not being material to the present invention is not illustrated or described in detail. The operating shaft 13 is driven through a suitable clutch or other operating mechanism of known construction from a fly wheel 19, or other suitable power device, which in turn may be operated from any suitable source of power by any convenient drive means, such as the belt illustrated in the drawings. The closing mold is adapted to receive a block of moldable material and to press the same to a desired form to produce a molded object.

In order to conveniently feed blocks of moldable material to the dies, I have provided a conveyor 21, comprising a continuous strip or belt carried on spaced rollers 23 and having receptacles which in the present instance comprise apertures 25 formed through the body of the conveyor and adapted to receive blocks of moldable material and means for controlling the movement of the belt so that the moldable material may be arranged in position to be received by and formed by the closing of the cooperating dies of the mold. The conveyor is moved progressively through the closing mold, each receptacle remaining centered between the dies for an interval sufficient to allow the dies to press together upon the belt and the moldable material carried therein to deform the latter to the desired shape. When the mold opens, the belt is moved until the next succeeding receptacle is arranged in the mold. The mechanism for moving the container is driven by a motor 27 suitably mounted upon a bracket 29 secured to the main frame 11 of the closing mold. The motor operates through reduction gears 31 to drive a gear 33 mounted on a shaft 35 which is suitable journaled in the frame 11. The shaft 35 carries a disk having a crank pin 37 set therein. A crank arm 39 pivoted at one end to the pin 37 is pivotally connected at its other end with an arm 41 fastened to a shaft 43 suitably journaled in the frame 11. The shaft 43 at each end has pawl carrying arms 45 which in turn have pawls 47 pivotally supported at their lower ends. The pawls 47 are carried in position such that their free ends ride along the upper surface of the conveyor behind the closing mold, the punch press frame at that point being formed to provide a substantially flat surface across which the conveyor may travel. The conveyor is provided with a spaced series of apertures or driving slots 51 arranged along each edge of the conveyor in position to receive the operating tips of the pawls 47. As the shaft 35 is rotated at constant speed by the motor 27, the pawls 47 are carried back and forth across the surface of the belt and their tips engage the apertures 51 during the rearward travel of the pawls and move the belt a distance equal to the spacing between the driving apertures 51. The apertures 25 and 51 of the belt are similarly spaced and the driving pawls are arranged with respect to the position of the dies of the closing mold so that when the belt is stationary during the forward travel of the pawls, a receptacle 25 is centered directly between the relatively movable dies 15 and 17 of the closing mold.

It will be apparent that when the relatively movable dies close together upon the belt that the latter will form a portion of the closing mold, that is to say, the sides of the aperture 25 of the belt will form a portion of the side walls of the molding cavity. It may be desirable on occasion to form the belt merely with a socket in place of the aperture 25 in which case the movable die 15 will cooperate with the belt itself to form the mold, the stationary die 17 acting merely to support the belt in position.

For purposes of illustration, I have shown a plurality of dies 15 and 17 and a plurality of apertures 25 in the conveyor, it being understood that any number of cooperating dies may be arranged in the press, limited only by the size of the press itself.

In order that the cooperating dies 15 and 17 may close when a receptacle 25 and its contents are centered in the closing mold, I have provided a means for controlling the operation of the movable die 15 comprising a transmission for conveying power to the ram 13 and a control means for the transmission. Inasmuch as the transmission may be of any suitable form and construction to accomplish the desired result, and inasmuch as such transmissions are well known in the art, and since moreover the specific constructions is a matter of individual preference, and since the specific construction of the transmission does not affect or modify the novel features of my present invention, I have not illustrated and shall not describe this transmission further than to briefly recite the results which it accomplishes in the operation of the device, which I have illustrated. The control means includes a cam member 53 mounted on the shaft 35 to rotate therewith. The cam 53 controls the operation of the die through a mechanism including a cam follower 55 carried in the end of a slidable control rod 57 journaled in the frame 11, depression of which connects the power through the transmission system (not shown) and causes the ram 13 to move downwardly and to remain in downward position until the rod 57 is released. The cam 53 is of such shape that the rod 57 is depressed throughout a considerable portion of the rotation of the shaft 35, that is to say the transmission is controlled to cause the closing mold to remain in closed position for an appreciable period or "dwell" to permit the mold to properly form the material, it being understood that the closing mold should remain in closed position for an appreciable period to permit the partially cured moldable material to be fully and finally cured in order to acquire the characteristic hardness of fully cured material.

Figures 1, 2, 3:
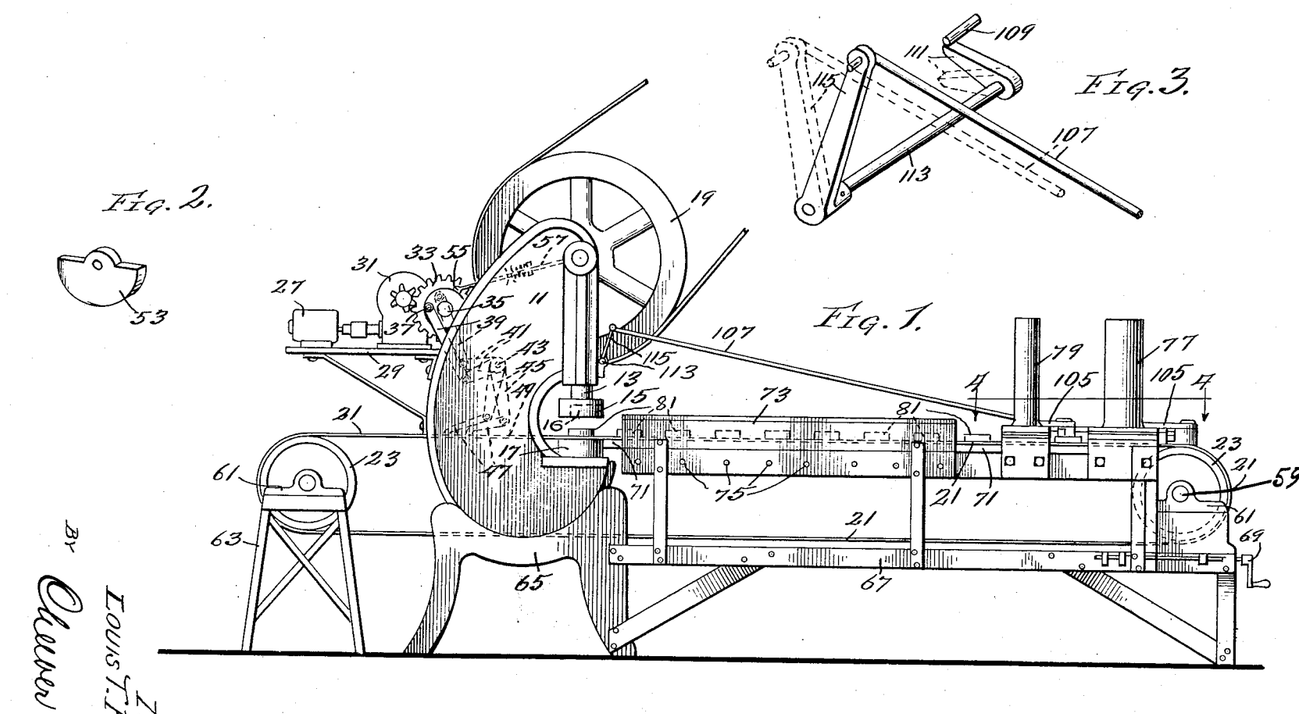
Figure 1 is an elevation view of my improved device for feeding moldable material to a closing mold.
Figure 2 is a perspective view of a control cam for governing the operation of the closing mold and feeding devices.
Figure 3 is a perspective view of a portion of the apparatus of Figure 1.
Figure 4:
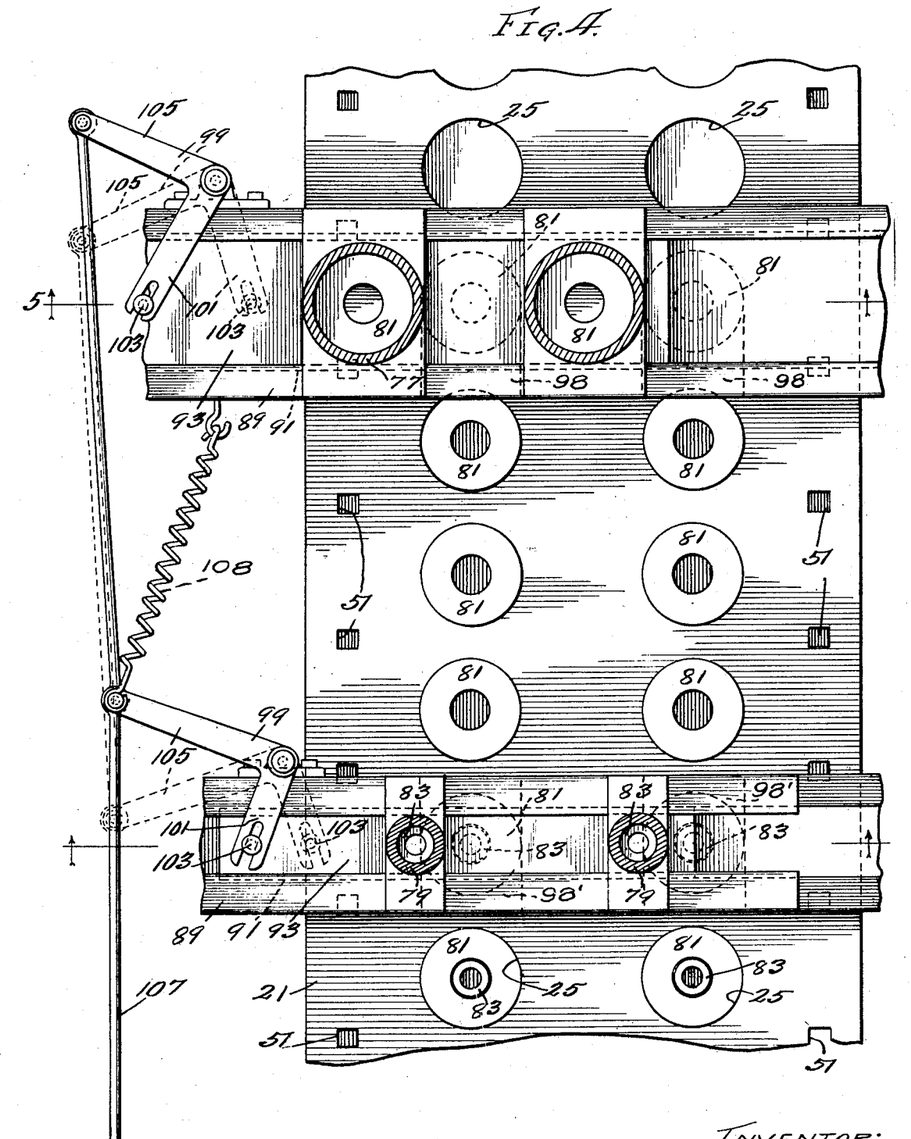
Figure 4 is a horizontal cross section taken substantially along the line 4—4 in Figure 1.
Figure 5:
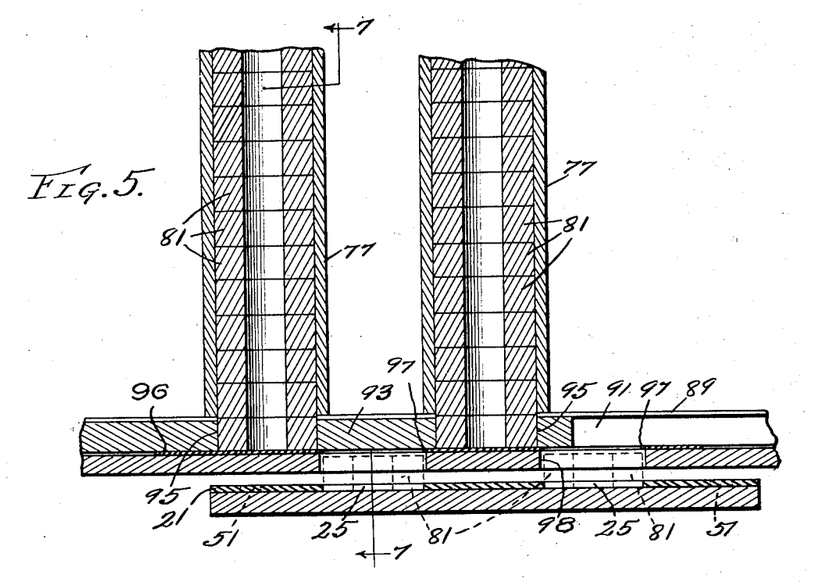
Figure 5 is a vertical cross section taken substantially along the line 5—5 in Figure 4.
Figure 6:
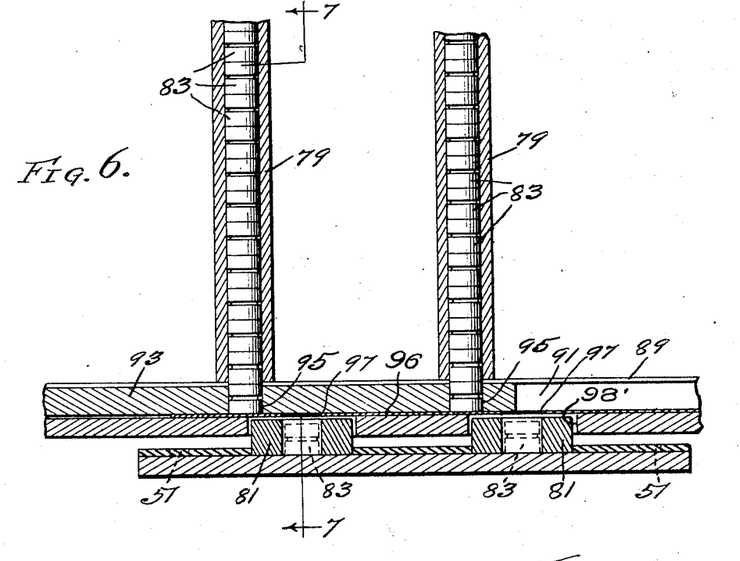
Figure 6 is a vertical cross section taken substantially along the line 6—6 in Figure 4.

The conveyor illustrated is of the endless belt type and is carried upon two spaced rollers 23 mounted on shafts 59 suitably journaled in pedestal bearings 61. The rearmost roller behind the closing mold is supported in a stand 63 which is secured to the base on which the various parts of my improved device may be arranged for operation. The frame 11 of the closing mold is carried in a supporting base 65 and the forward roller 23 is mounted in a frame or stand 67 extending outwardly in front of the closing mold and secured to the base 65 as shown clearly in Figure 1. The bearing 61 of the forward roller is slidably mounted in the frame 67 and I have provided a control screw 69 for moving the bearing laterally in the frame to adjust the tension of the conveyor and to take up the slack.

It is desirable to introduce the moldable material into the closing mold in a partially cured condition in order that the time of the molding and final curing operation may be materially reduced and in order that moldable material having quick curing properties may be utilized commercially in the manufacture of molded products, and to this end I provide a curing oven through which the moldable material may be carried in the conveyor before being positioned in the closing mold This oven comprises a substantially elongated housing 73 suitably supported from the frame 67 and heated by means of heating elements 75 which may be of any convenient type such as electric heating units or gas jets or other heating means of a controllable nature whereby a desired temperature within the housing may be maintained. By passing uncured blocks of moldable material through such an oven at a uniform rate, I am able to cure the blocks to exactly the proper condition for feeding into the closing mold since I am able to control the temperature of the curing oven within small limits of variation. This is of extreme importance when quick curing materials are being handled since a slight variation in the temperature of the oven or in the curing time will greatly affect the condition in which the material is fed to the closing mold and in such case, the advantage of accurately controlling the temperature of the oven will be readily appreciated.

The apparatus described thus far may be operated by positioning blocks of moldable material in the receptacles of the belt just before it enters the curing oven. The blocks are placed within the apertures 25 and are supported upon a table 71 which extends beneath the conveyor through the oven to the closing mold and which has an upper surface arranged in alignment with the upper surface of the lower die 17. The moldable material may be deposited in the conveyor manually, but I have shown a magazine 77 in which blocks 81 of the moldable material may be arranged and ejected automatically therefrom at intervals as the apertures 25 remain stationary under the discharge end of the magazines, during the operation of the closing mold, as shown in Figure 7 of the drawings.

Figures 7, 8, 9, 10:
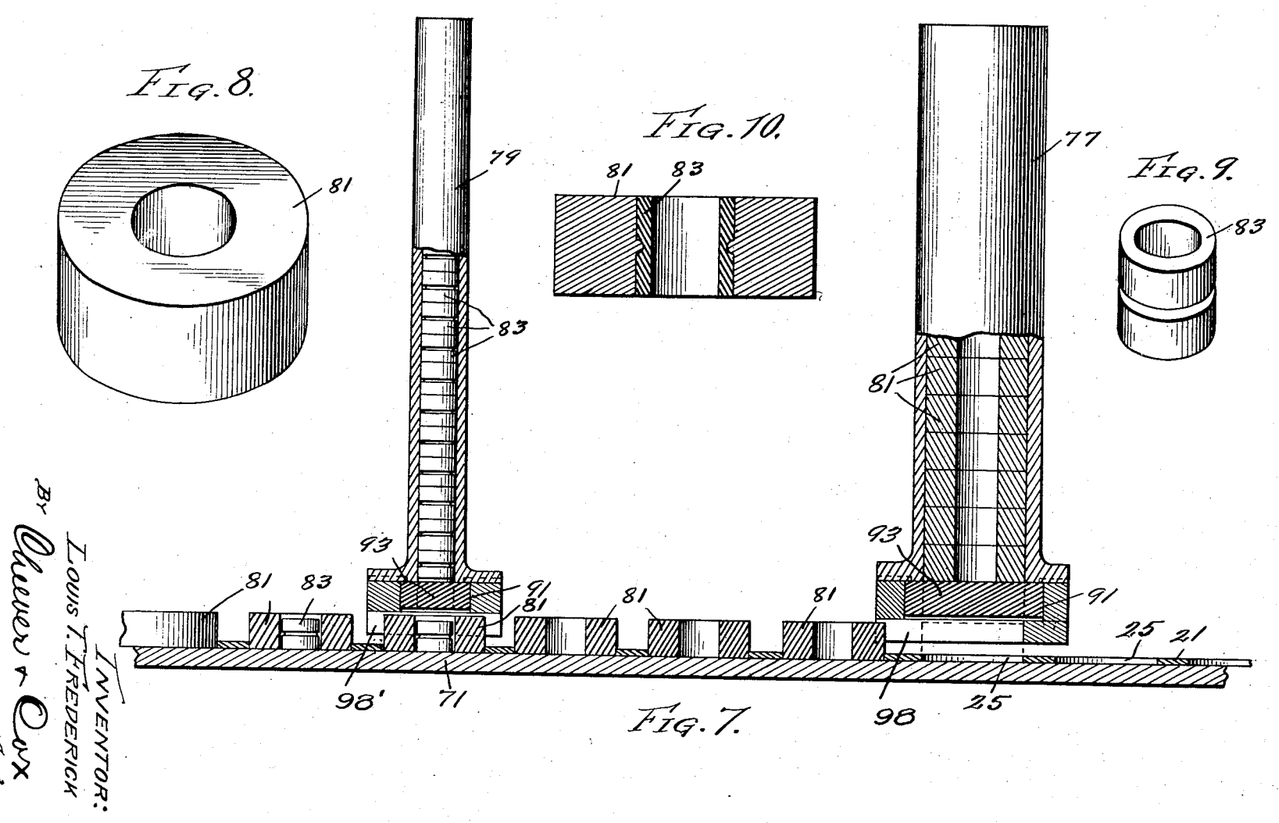
Figure 7 is a vertical cross section taken substantially along the lines 7—7 in Figures 5 and 6.
Figure 8 is a perspective view illustrating a block of moldable material which may be handled successfully by the device of my invention.
Figure 9 is a perspective view of an insert of a type adapted to be assembled in the block of moldable material by the apparatus of my invention.
Figure 10 is a vertical cross section taken through a molded object of a class which may be formed by the devices of my invention.

It is often desirable to pre-assemble an insert such as the metal hub member 83, in an aperture formed in the block of moldable material in order that the molded object may comprise a composite device such as that illustrated in Figure 10 of the drawings in which the insert comprises a metal hub around which the outer moldable material is compressed, and I have illustrated a second magazine 79 adapted to contain a plurality of metal inserts and to discharge metal inserts into the blocks of moldable material deposited in the conveyor by the magazine 77 as said blocks remain stationary beneath the discharge end of the magazine 79. The magazines 77 and 79 are substantially the same in construction (and it is thought unnecessary to describe each in detail). Each magazine is supported from the table 71 by means of a support 89 extending across the table at a sufficient height thereover to permit the conveyor to pass thereunder. The magazine support is provided with a groove 91 in the upper surface thereof and a slide 93 is arranged to reciprocate in the groove. This slide is provided with apertures 95 which are adapted, when the slide is in retracted position, to align beneath the magazines 77 and 79 and to receive the lowermost element from the mazagines. The slide may then be moved from retracted to advanced position in which the apertures 95 align with apertures 97 formed through the support in the bottom of the groove 91. These apertures are centered directly over a portion of the table 71 at which the apertures 25 of the conveyor are stationary during the operation of the closing mold, so that if the slides 93 are operated simultaneously with the closing mold, the element carried in the apertures 95 will be deposited in the receptacle 25 of the conveyor. The apertures 97 are formed in thin strips of sheet metal 96, which are set in the bottom of the grooves 91, and the support for the magazines 77 is provided with a channel 98 extending below this strip from the apertures 97 to the forward edge of the magazine support. The sides of this channel serve to guide the blocks of material 81 into the receptacles 25 of the conveyor. The support for the magazines 79 is provided with a similar groove 98', which extends across the lower surface of the magazine support from the rearmost to the foremost edge thereof, and which communicates at its central portions with the aperture 97 formed in the strip of sheet metal 96. Each slide member 93 rests in a groove 91 on top of a sheet metal strip 96 and is actuated by a bell crank 99 pivotally mounted to the magazine support 89 and having an arm 101 engaging a pin 103 mounted in the slide. The other arm 105 of the bell crank engages a driving rod 107 which is actuated periodically by a pin 109 carried on the die operating rod 13. As the die operating rod moves downwardly, the pin 109 engages an arm 111 mounted on a shaft 113 suitably journaled in the frame 11 of the press. The shaft 113 carries another arm 115 which pivotally engages the rod 107. As the closing mold operates, the driving rod 107 is moved to actuate the slide members 93 so that these slide members are operated each time the closing mold operates, that is to say, when the conveyor is stationary so that elements are discharged from the magazines into the conveyor when the latter is stationary thereunder. A spring 108 returns the parts to normal position after each stroke of the ram. It will be understood that upon occasion the insert and moldable material might be reversed, that is to say, the insert might be formed as a casing into which the moldable material is inserted. In such a case the parts of the machine might be arranged to accommodate the new condition without departing from the scope of the present invention.

Figures 11, 12:
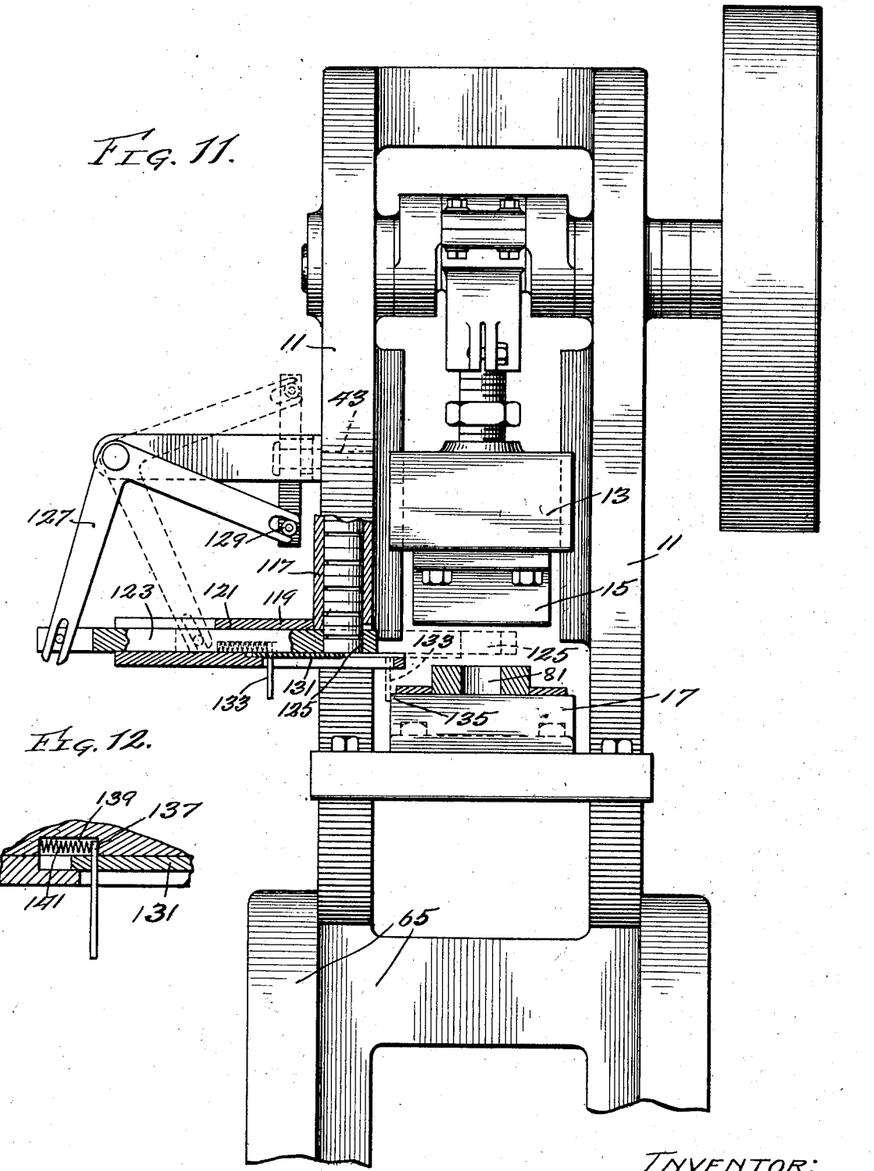
Figure 11 is a perspective view of the closing mold and associated apparatus to illustrate a modification thereof.
Figure 12 is an enlarged fragmentary view of a portion of the apparatus illustrated in Figure 11.

It may be desirable to introduce the insert into the block of moldable material after the latter has been positioned in the closing mold and just before the closing mold operates. In Figure 11, I have illustrated means for accomplishing this. The insert elements are carried in a magazine 117 suitably supported in a support member 119 secured to the main frame 11 of the press opposite the dies of the closing mold. The support is provided with a groove 121 in which a slide 123 is adapted to reciprocate. The slide is provided with an aperture 125 and when in retracted position, this aperture is adapted to align beneath the magazine 117 and to receive the lowermost element carried in the magazine, which drops into the aperture from the magazine. The element is supported in the aperture by means of a slide member 131 which has a pin 137 extending upwardly and seating in a groove 139 formed in the slide. The slide is urged normally to cover the bottom of the aperture 125 by means of a spring 141 arranged in the groove 139 and having an end engaging the pin 137. When the slide 123 is advanced, the aperture 125 is aligned over the socket formed in the moldable material to receive the insert and a pin 133 formed on the slide 131 engages a shoulder or stop 135 formed in the frame of the press and retracts the slide 131 from beneath the aperture 125, which allows the element to slide downwardly into the socket of the block of moldable material. The slide 123 is reciprocated by means of a bell crank 127 pivotally mounted to the frame 11 and having an arm engaging a pin mounted in the slide. The other arm of the bell crank engages a pin 129 carried by an arm mounted in the shaft 43 and the parts are arranged so that the slide 123 is projected and retracted during the interval after the block of moldable material has been positioned in the closing mold and before the mold commences to operate. It will be apparent that a machine of the type herein described will materially reduce the time required to form a molded object and will consequently assist in the reduction of the production costs by the elimination of skilled workmen and of the time necessary to cure and mold the material. By providing a press having a plurality of closing molds and a conveyor having a plurality of receptacles or pockets formed therein, the ultimate capacity of a single press may be realized. The device heretofore described also eliminates the necessity of using multiple molds which are not only costly but also have limited scope due to the fact that they may be used only with the slow curing materials and are not adapted to the method of curing and molding the material as a continuous process. It will also be apparent that the quality of the product may be materially improved and rendered more uniform by carefully regulating the temperature of the curing oven, and the fact that each block of material molded is cured during the same time interval as every other block, a product having a more uniform texture will be produced.

It will be apparent that numerous changes may be made in the form and arrangement of the various parts herein described without departing from the spirit and scope of the invention, the description herein being of a preferred embodiment for purposes of illustration only.

In my co-pending application, Serial No. 247,671, filed January 18th, 1928, I have illustrated and claimed a means and method for feeding mica discs to a heated closing mold and I do not claim herein anything which I have shown and illustrated in said co-pending application.

Having thus described my invention what I claim as new and desire to secure by Letters Patent is:

1. In a device of the class described, a closing mold and a conveyor comprising a receptacled strip for carrying moldable material to the closing mold, the conveyor being adapted to co-operate with the dies of the closing mold to form a part of the mold when in closed position.

2. In a device of the class described, the combination of a closing mold including a movable die and a conveyor comprising a receptacled strip of resilient material adapted to carry moldable material to the the closing mold, said die being adapted to close upon the conveyor to form a mold having the conveyor as a part thereof.

3. In a device of the class described, a closing mold comprising relatively movable dies and a receptacled conveyor comprising a strip of flexible material adapted to carry moldable material between said dies, said dies being adapted to close upon said conveyor, said conveyor being adapted to co-operate with said closed dies to form a zone of the mold.

4. In a device of the class described, a closing mold having relatively movable dies and a flexible conveyor for carrying moldable material and positioning the same between said dies, said dies being arranged to close upon said conveyor and said conveyor being adapted to co-operate with said dies to form a mold for said moldable material.

5. In a device of the class described, an integral conveyor having portions formed to receive moldable material and means for moving said conveyor to position said moldable material in a closing mold, said conveyor being adapted to become a part of the mold during the closing thereof.

6. In a device of the class described, a conveyer having a socket adapted to receive moldable material, means for guiding said conveyor to arrange said socket in a closing mold in position so that the molding material may be formed by the closing of said mold, said conveyor being adapted to co-operate with the closing mold during the closing thereof to form a zone of the mold.

7. In a device of the class described, the combination with a closing mold of a conveyor adapted to carry moldable material to the mold and to remain stationary and form a part of the sides of the mold during the closing operation.

8. In a device of the class described, a closing mold, a conveyer adapted to receive and partially enclose moldable material, means for moving said conveyor through said closing mold, means interrupting said movement whereby the material carried by the conveyor may be positioned in said closing mold to be formed thereby and means for closing the mold while said material is so positioned.

9. In a device of the class described, a closing mold, a curing oven, a conveyor adapted to receive and partially enclose moldable material, means for moving said conveyor through said oven and said mold, means interrupting said movement whereby said material may be arranged in said mold in position to be formed thereby and means for closing said mold while said material is so positioned.

10. In a device of the class described, a closing mold, a curing oven, a conveyor adapted to receive moldable material, means for positioning moldable material in the conveyor, means for moving said conveyor through said oven and said mold whereby to carry the moldable material through the oven, in order to partially cure it and thence to the mold, means interrupting said movement whereby said material may be arranged in said mold in position to be formed thereby and means for closing said mold while said material is so positioned whereby to form the material and to cause the curing thereof.

11. In a device of the class described, a closing mold, a curing oven, a magazine for containing blocks of uncured moldable material, a conveyor adapted to receive blocks from said magazine, means for moving said conveyor through said curing oven and said mold, and means for interrupting said movement to arrange the moldable material carried by said conveyor in position to be formed by the closing thereof, and means for closing said mold when said material is so positioned.

12. In a device of the class described, a closing mold, a curing oven, a magazine adapted to contain preformed blocks of uncured moldable material, a second magazine adapted to contain insert members, a conveyor adapted to receive blocks of moldable material from said magazine, means for moving said conveyor past said magazines through said oven and said closing mold, means interrupting said movement to position a block of material carried by said conveyor in the mold in position to be formed by the closing thereof, and means for operating said mold when said material is so positioned and for simultaneously depositing a block of material in the conveyor from said first mentioned magazine and depositing an insert from said second magazine into a block of moldable material carried in the conveyor.

13. The method of forming objects from heat curable moldable material which comprises conveying a block of the moldable material through a curing oven in order to partially cure the same and thereafter configurating said cured block to a desired shape under heat and pressure whereby to completely cure the same.

14. The method of forming objects from heat curable moldable material which comprises conveying blocks of the material through a curing zone during a definite time interval and finally pressing the blocks to a desired shape.

15. The method of forming objects from heat curable moldable material which comprises preforming a block of uncured moldable material, conveying said preformed block at a uniform rate through a curing zone and immediately thereafter pressing said cured material to a desired shape.

16. The method of manufacturing composite objects from heat curable material which comprises preforming a block of uncured moldable material, assembling an insert therewith and thereafter conveying said assembled object through a curing zone to partially cure the moldable material, and finally heating and pressing said cured object to integrate it and to give it a desired shape and to completely cure the material.

17. The method of forming molded objects from heat curable material which consists in first partially curing a block of heat curable material and finally molding the partially cured block to a desired shape and simultaneously completing the curing of the material.

18. An apparatus for producing molded objects which comprises means forming a zone in which blocks of material from which the objects are to be formed, may be partially cured, a press for molding the blocks to final shape and for carrying the curing of the material to completion, and means for feeding the blocks through the curing zone and into the press at a definite rate of speed, so that each block may enter the press when it has been pre-cured to a definite pre-determined condition.

19. An apparatus for producing molded objects from heat curable material, which comprises a curing oven in which blocks of material from which molded objects may be formed may be partially cured, means for molding the blocks to final shape and to simultaneously complete the curing of the material, and a conveyor for carrying blocks of the material through the curing zone to the molding means at a pre-determined rate of speed so that each block may be delivered to the molding means in a definite pre-cured condition.

20. An apparatus for producing molded objects from heat curable and moldable material, which comprises an oven forming a zone in which blocks of suitable material may be treated to a definite pre-cured condition, a press for molding the pre-cured blocks to final shape, and to complete the curing of the material and a conveyor for carrying the blocks through the oven at a definite rate of speed in order that each block may be subjected to the same curing process, and thereafter delivering the pre-cured blocks to the press.

In witness whereof, I have hereunto subscribed my name.

LOUIS T. FREDERICK.